US006851167B2

(12) United States Patent
Harlow et al.

(10) Patent No.: US 6,851,167 B2
(45) Date of Patent: Feb. 8, 2005

(54) METHOD FOR INSTALLING BLIND THREADED INSERTS

(75) Inventors: Gary Harlow, Bethlehem, PA (US); Ronald S. Dise, Perkasie, PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 10/820,775

(22) Filed: Apr. 9, 2004

(65) Prior Publication Data

US 2004/0226159 A1 Nov. 18, 2004

Related U.S. Application Data

(60) Provisional application No. 60/466,410, filed on Apr. 30, 2003.

(51) Int. Cl.⁷ .............................................. B23P 21/00
(52) U.S. Cl. .............................. 29/407.01; 29/407.05; 29/407.08; 29/509; 29/522.1; 29/525.05; 29/715; 29/243.5; 73/862.381; 73/862.451; 73/862.53; 403/282
(58) Field of Search .................. 29/407.01, 407.05, 29/407.08, 407.09, 407.1, 509, 522.1, 525.05, 709, 715, 243.5, 243.53, 283.5; 411/360, 501; 403/282; 73/862.381, 362.451, 862.53

(56) References Cited

U.S. PATENT DOCUMENTS

| 4,163,311 | A | | 8/1979 | Sigmund | 29/407 |
|---|---|---|---|---|---|
| 4,233,721 | A | | 11/1980 | Eshghy | 29/407 |
| 4,244,245 | A | | 1/1981 | Wallace | 81/469 |
| 4,619,396 | A | | 10/1986 | Yamamoto | 228/102 |
| 5,398,537 | A | | 3/1995 | Michalewski | 72/430 |
| 5,492,185 | A | | 2/1996 | Schoeps | 173/177 |
| 5,526,669 | A | | 6/1996 | Gjovik | 72/391 |
| 5,655,289 | A | | 8/1997 | Wille | 29/703 |
| 5,813,110 | A | * | 9/1998 | Arntson et al. | 29/701 |
| 5,956,251 | A | | 9/1999 | Atkinson | 364/468 |
| 6,240,613 | B1 | | 6/2001 | OConnor | 29/407 |
| 6,276,050 | B1 | | 8/2001 | Mauer | 29/716 |

* cited by examiner

Primary Examiner—David P. Bryant
Assistant Examiner—Jermie E. Cozart
(74) Attorney, Agent, or Firm—Gregory J. Gore

(57) ABSTRACT

A spin-pull blind insert tool utilizes a control system that generates a stop signal based on the relationship between the force values and the motion values derived from the action of the tool mandrel. The improved control system utilizes the shape of the force-deformation curve and not just a given pre-set force value or pull distance. Hence, the control system of the present invention does not require any set-up for changes in panel thickness unless the mandrel is also changed to install a different thread size. This control system develops a force-deformation curve as the fastener is being installed. The stop signal is generated when a pre-set deformation point has been exceeded and the shape of the force curve can be characterized by either of two types. For either type, an algorithm is followed which establishes an optimum stopping point for the installation tool regardless of the panel thickness into which the blind rivet is being installed.

4 Claims, 7 Drawing Sheets

METHOD FOR INSTALLING BLIND THREADED INSERTS

RELATED APPLICATIONS

The present application is related to provisional patent application Ser. No. 60/466,410 entitled "Tool and Method for Installing Blind Threaded Inserts" filed on Apr. 30, 2003, priority from which is hereby claimed.

FIELD OF THE INVENTION

This invention relates to an improved control method for regulating the operation of a hand tool. More specifically, it relates to a hand tool control method for the installation of blind threaded fasteners which deform under a compressive force to grip a panel.

BACKGROUND OF THE INVENTION

Blind threaded fasteners are fasteners, either internally or externally threaded, that can be first installed into a hole in a panel with access to one side of the panel only, hence the term "blind". Most of these fasteners contain three basic components: a head, an intermediate collapsible thin-walled shank, and an internally threaded region at the end. As depicted sequentially in FIGS. 1, 2, 3, and 4, the threaded area and a portion of the shank are first installed into the panel hole and then a compressive force is applied to the shank with a tool by pulling on the threaded region while supporting the head. This compression causes the shank to deform and buckle outwardly, creating what is known as a "bulb" on the side of the sheet opposite the head. The threaded tool member used to compress the shank is then removed, leaving the fastener permanently gripped to the panel being restrained by the head in one direction and the bulb in the other direction.

Presently available tools for applying the compressive load (upset force) to collapse the shank can be divided into two broad categories, spin-spin tools and spin-pull tools. Both types of tools utilize an anvil, also known as a nosepiece, from which a mandrel projects. Its function is to support the head of the fastener while the mandrel retracts or spins to force the insert toward the anvil. Spin-spin tools apply the compressive load to the shank by applying enough torque to a mandrel threaded into the fastener to produce the required load. Spin-spin tools are inexpensive, lightweight and simple to set up and use and are therefore generally preferred. However, because the upset force they can develop is limited, they generally cannot be used to install parts having thicker walls. Spin-pull tools spin the mating threaded member into position, then apply an axial pulling force by retracting the mandrel. The mandrel is then removed by spinning it in the opposite direction. Spin-pull tools are more complex and consequently more expensive and heavier than spin-spin tools. They are also more difficult to set up and require more maintenance. In spite of these disadvantages, spin-pull tools are the best available choice for thick-walled parts requiring higher compressive loads to form the bulb.

Both types of tools require time-consuming set-up steps with some degree of trial and error and a skilled operator. Spin-spin tools require mandrel length adjustment and adjustment to the stall torque. Spin-pull tools require an anvil adjustment relative to the fully-extended position of the mandrel and an adjustment to the stroke or pulling pressure. The set-up requirements of either type of tool represent lost time and require significant operator training.

To enhance their operation, both types of tools often include control systems based on installing to a given torque or pulling to a given distance or a given force. In either case, these limits need to be determined during a set-up phase before the tool can be used.

Although spin-pull tools are the better choice for thick wall parts, problems persist with this type of tool. Pull-to-distance tools must have their stroke set properly in order to install an insert, and a certain level of skill and understanding is required to set the stroke. Also, once set-up, pull-to-distance tools can only install inserts into one grip thickness. Another problem is that pull-to-force tools require setting the force so that it is high enough to ensure that all inserts will be installed, but not so high as to damage any inserts with the excessive force. A certain level of skill and understanding is required to properly set the force. Furthermore, tools using a closed hydraulic system will no longer achieve full stroke after a certain amount of hydraulic fluid has leaked out of the system. If not detected immediately, this can lead to under-installed inserts. Even if detected immediately, downtime will occur while hydraulic fluid is added.

There is therefore a need in the art to provide a spin-pull type of tool which is most suitable for thick-walled applications which overcomes the disadvantages of prior art spin-pull type tools for installing blind threaded fasteners.

SUMMARY OF THE PRESENT INVENTION

In order to solve the above-described problems in the art, the present tool for installing blind threaded fasteners has been devised. A spin-pull tool used in combination with the control system of the present invention employs the features known to spin-pull-type installation tools which have means to suddenly stop the tool from applying additional force in response to a stop signal, however it is the way in which the stop signal is produced which sets the present invention apart from the prior art. A significant new teaching of this invention is the concept that the logic necessary to properly install any bulbing-type fastener can be achieved solely by a tool control system. The present invention generates a stop signal based on the relationship between the force values and the motion values derived from the action of the mandrel. The improved control system utilizes the shape of the force-deformation curve and not just a given pre-set force value or pull distance. Hence, the control system of the present invention does not require any set-up unless the mandrel is physically changed to install a different thread size.

It is well-known in the art that if a blind threaded insert is installed with a device capable of producing a real-time plot of force-versus-deformation, a knowledgeable technician can observe the shape of the developing curve and reliably determine the proper stopping point. The control system of the present invention is based on an algorithm which captures the same logic used by a technician operating the tool manually. The control system of the invention develops a force/deformation curve as the fastener is being installed. The stop signal is generated when a pre-set deformation point has been exceeded which occurs when a tangent line on the developing force/deformation curve becomes negative or stops decreasing.

Some tools of the existing art are equipped to monitor force, deformation or both force and deformation. This makes it possible to establish an acceptable range of force values or deformation values, or to define a region on the force-deformation curve considered to represent a proper installation. When such acceptable limits have been established it is possible for tools of the existing art to provide an error message stating that the limits were not satisfied at the stopping point and giving details of the discrepancy. However, for tools of the existing art, the actual stopping point is always determined by either the preset torque, stroke or force of the tool. The present invention, on the other hand, will always stop the installation process based on the shape of the force-deformation curve. As with tools of the existing art, the tool of the present invention can also be given acceptable limits and provide an error message stating that the limits were not satisfied at the stopping point and giving details of the discrepancy.

When an error message is present, the affected unit is typically identified as possibly non-conforming and segregated for further review. The present invention offers a significant advantage in the case of an error or fault condition in that there is a greater probability that the insert was installed properly and the unit will not require rework. This is because the control system of the present invention is based on curve shape and not a given force magnitude and therefore able to adapt to slight variations in grip thickness, insert dimensions or insert mechanical properties. Such variations might normally occur when changing to a different manufacturing lot of inserts or to a different manufacturing lot of the workpiece.

The present control system provides means for providing the following functions.
1) Periodically approximating the slope of the force-deformation curve.
2) Periodically calculating the force axis intercept of a straight line that is tangent to a recent point on the force-deformation curve.
3) Defining a deformation setpoint.
4) Determining whether the approximate slope of the force deformation curve changes from positive to negative prior to the deformation setpoint.
5) Capturing the maximum force observed prior to the defined deformation setpoint in those instances when the slope changes from positive to negative prior to the deformation setpoint.
6) Determining when the force axis intercept of a straight line that is tangent to a recent point on the force-deformation curve becomes negative or stops decreasing after the deformation setpoint has been exceeded.
7) Capturing the force value observed when the force intercept of a straight line that is tangent to a recent point on the force-deformation curve becomes negative or stops decreasing.
8) Generating a stop signal when a specified force value is observed.
9) Capturing the maximum force and maximum deformation observed during the installation cycle and comparing them to a defined range of values and then calculating their deviation.

Therefore, it is a main object of the present invention to provide a control system for a threaded blind insert installation tool which includes a logic that properly installs any bulbing type fastener. It is also an object of the present invention to provide a blind threaded fastener installation tool in which the set-up steps necessary with tools of the existing art are not required. It is a further object of the present invention to provide a blind threaded fastener installation tool which can install a variety of fasteners of the same thread side into a variety of grip dimensions without the need to adjust or change the control algorithm. It is yet a further object of the present invention to provide a control algorithm for a blind threaded fastener installation tool in which changes in fastener or grip conditions can be detected. Other objects and advantages will become apparent to those of skill in the art from the following drawings and description of the preferred embodiment.

DESCRIPTION OF THE PREFERRED EMBODIMENT

The following operational sequence is an overview of the operation of the preferred embodiment of the invention and assumes a tool head mounted to the end of a robot arm. The sequence for a hand held tool manipulated by an operator is essentially the same. In the preferred embodiment shown in FIGS. 1–4, the pulling force is applied as many similar prior art hand tools by a hydraulic cylinder, it being understood that the control system of the invention may be applied to available tools of this type.

Figure 1:
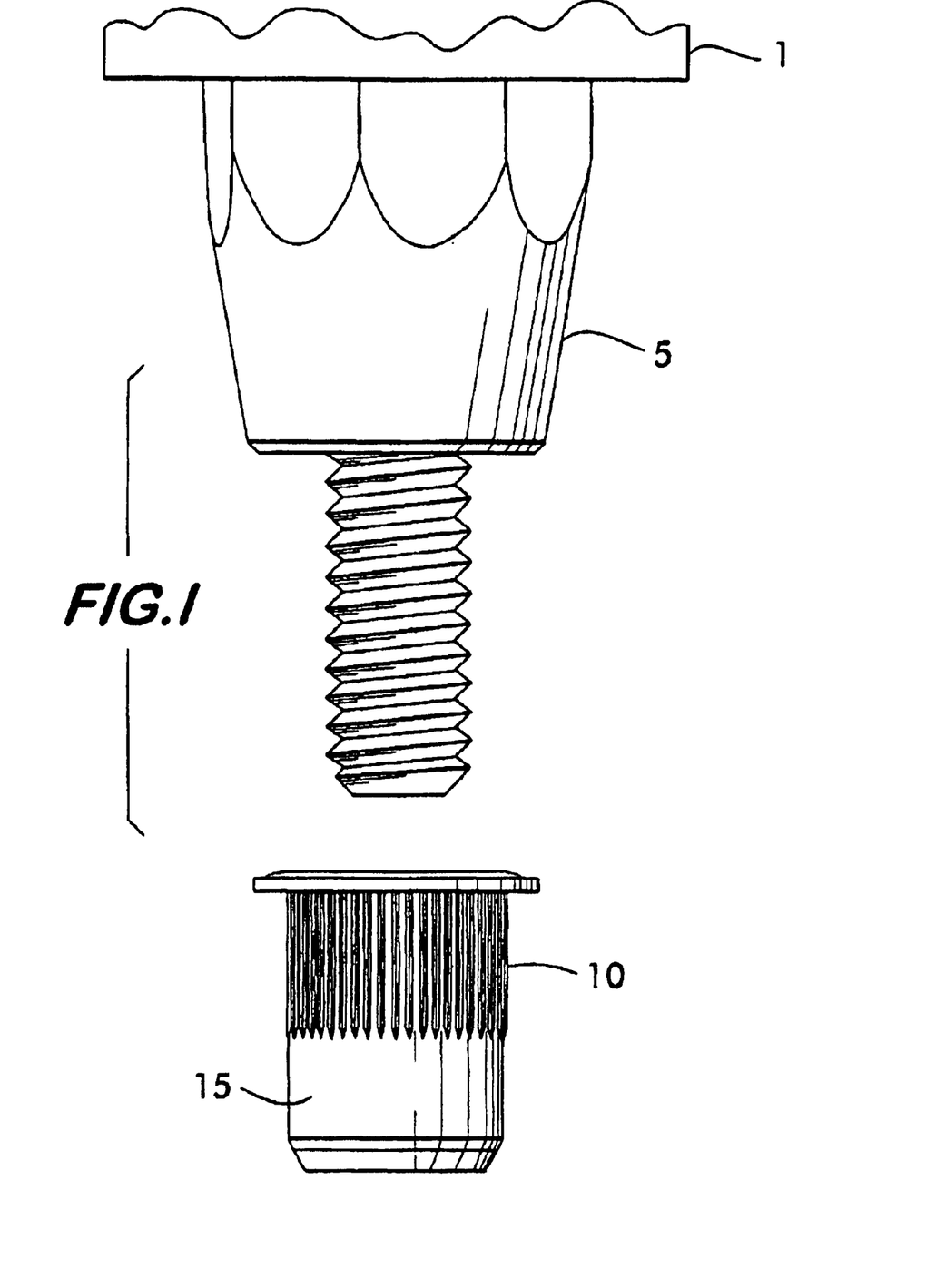
FIG. 1 is a front view of the operative end of a tool which utilizes the invention and an insert to be installed.
Figure 2:
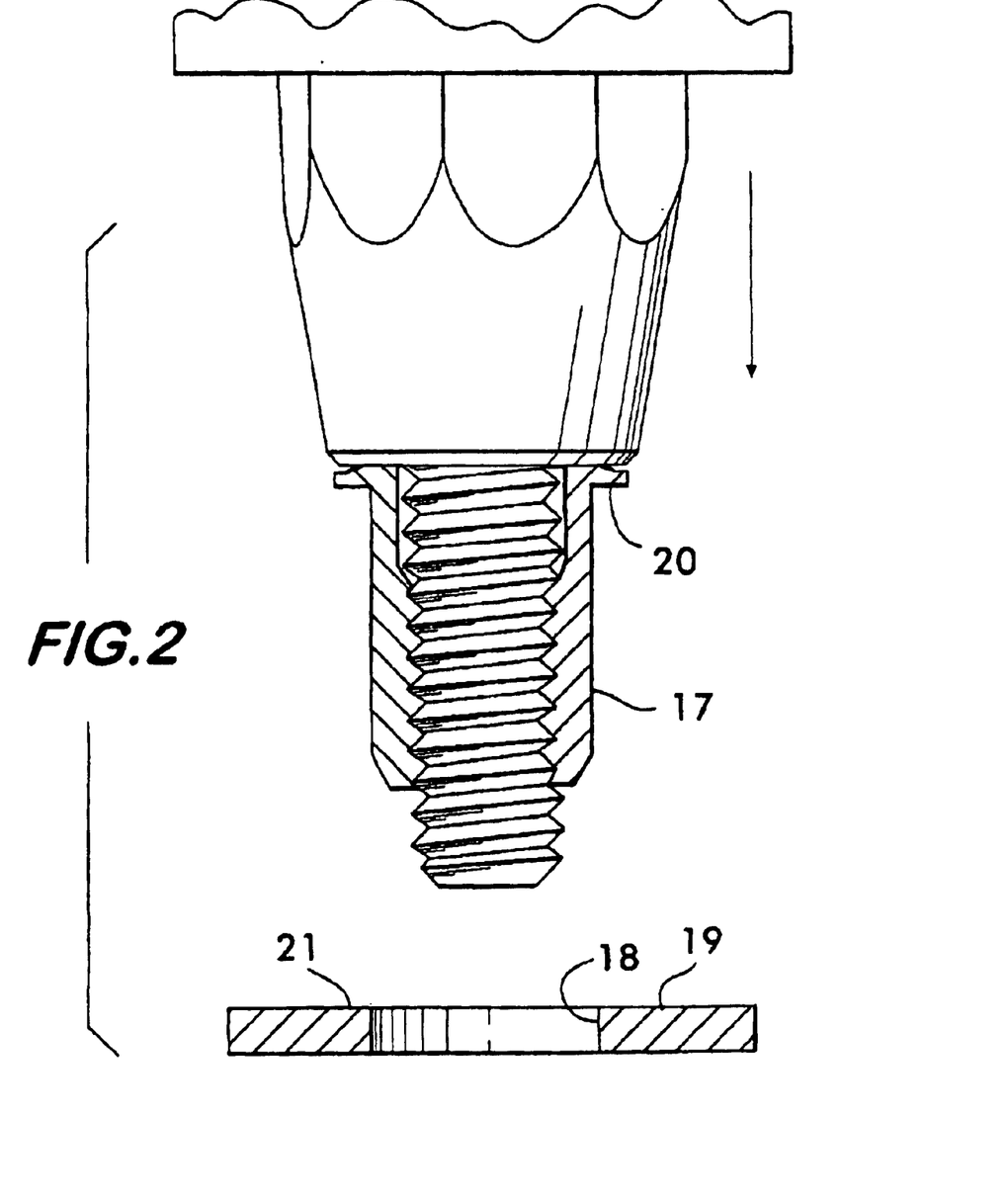
FIG. 2 is a front view of the tool with the insert positioned on the tool in alignment with an apertured panel shown in cross-section to which the insert is to be installed.

Referring first to FIG. 1, the insert head support means 5 is adjustably attached to the body of the hydraulic cylinder 1. A threaded mandrel 6 extends from the support. The sequence of operation of the preferred embodiment begins with the mandrel in the fully extended state as shown in FIG. 1. An insert 10 supported by a means not shown is in correct radial position, but is axially removed from the mandrel 6. The first action required is the rotation of the mandrel in the direction required to engage the threads of the insert 10. Simultaneously the tool moves axially and the mandrel thereby becomes engaged with the insert threads. The resulting position is shown in FIG. 2. Since the mandrel threads are now engaged with the insert threads, the insert will move with the tool when the tool is moved. The next action in the sequence is to move the tool to the workpiece and to insert the fastener body 17 into the hole 18 in the workpiece 19 as depicted in FIG. 2.

Figure 3:
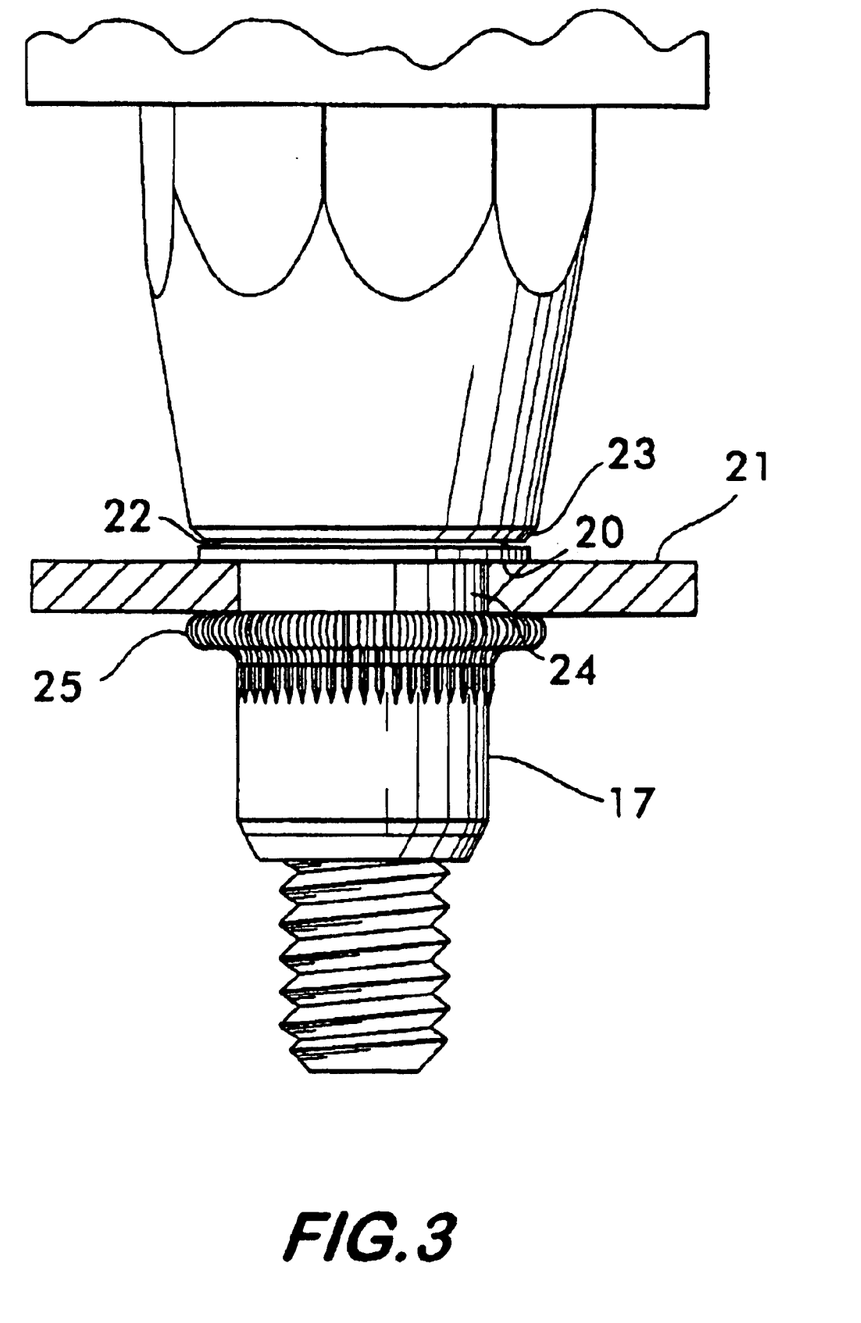
FIG. 3 is a front view of the tool engaged with the insert having been installed into a panel.

Referring now to FIG. 3, after the insert has been installed completely so that the underside of the head 20 is in intimate contact with the outer surface of the workpiece 21, the pulling action is initiated. The top of the insert head 22 contacts the end surface of the head support means 23 and therefore the counterbored area 24 of the insert 10 is placed in compression. The compressive load causes the counterbored area to buckle outwardly creating a bulb 25 which captivates the insert in the workpiece. Sensing means known in the art measures force and distance at short intervals during the pulling operation. These measurements are inputted into a control device that is programmed to apply a control algorithm as described below and in FIGS. 5–7. When the control algorithm determines that the stopping point has been reached a signal is immediately sent to suddenly stop applying additional force. The control system will then either hold the position of the threaded member relative to the head supporting member or return the threaded member to the fully extended position.

Figure 4:
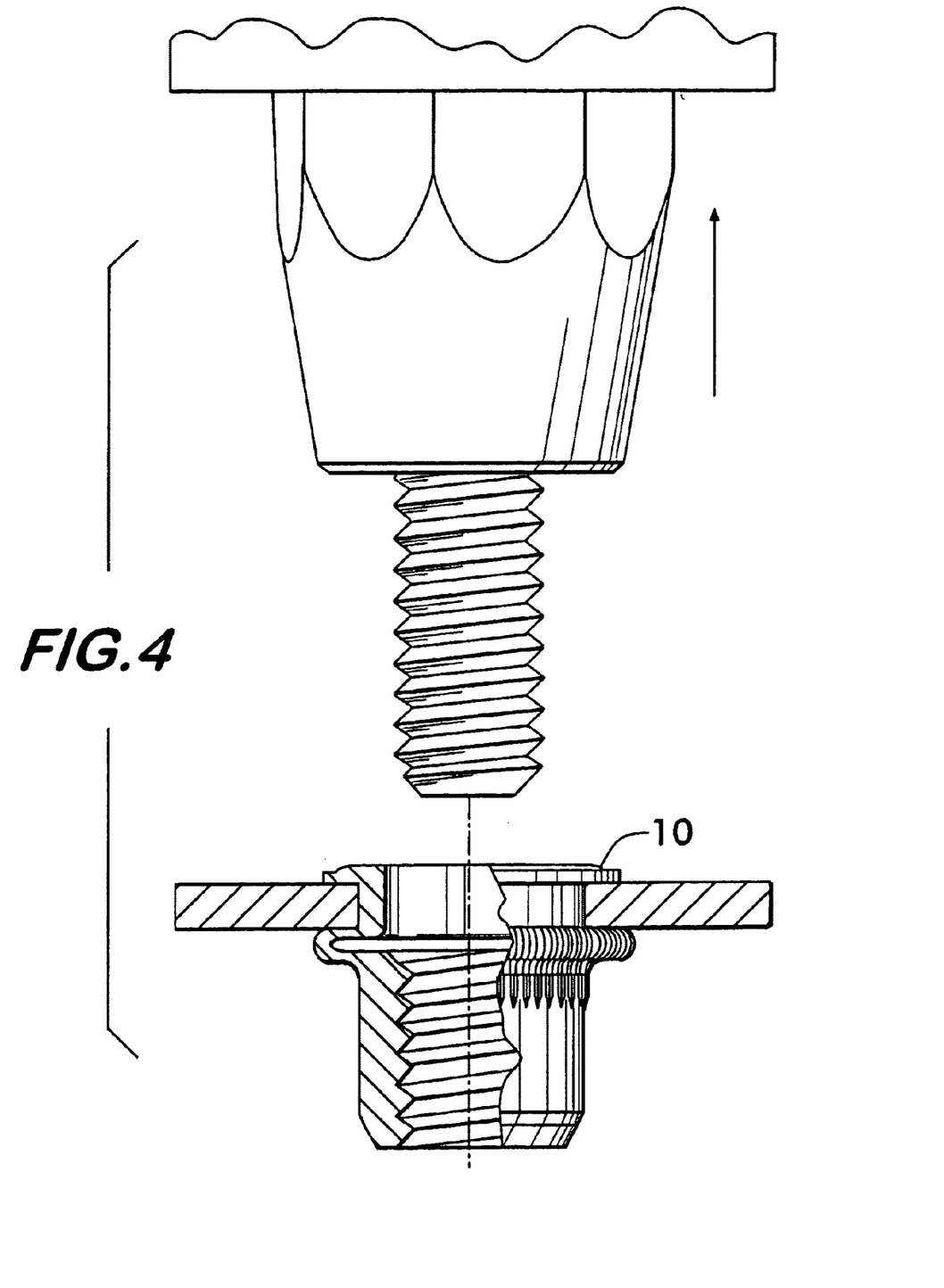
FIG. 4 is a front view of the tool disengaged from the insert after installation.

The next action in the installation sequence is the disengagement of the mandrel from the installed insert as shown in FIG. 4. This is accomplished by simultaneously rotating the threaded mandrel in the direction required to disengage the threads and moving the tool axially away from the insert thereby completely disengaging the tool from the installed insert 10. If not already returned to its fully extended position, the tool will be moved an adequate axial distance away from the installed insert and the mandrel will be returned to the fully extended position, completing the installation sequence.

Figure 5:
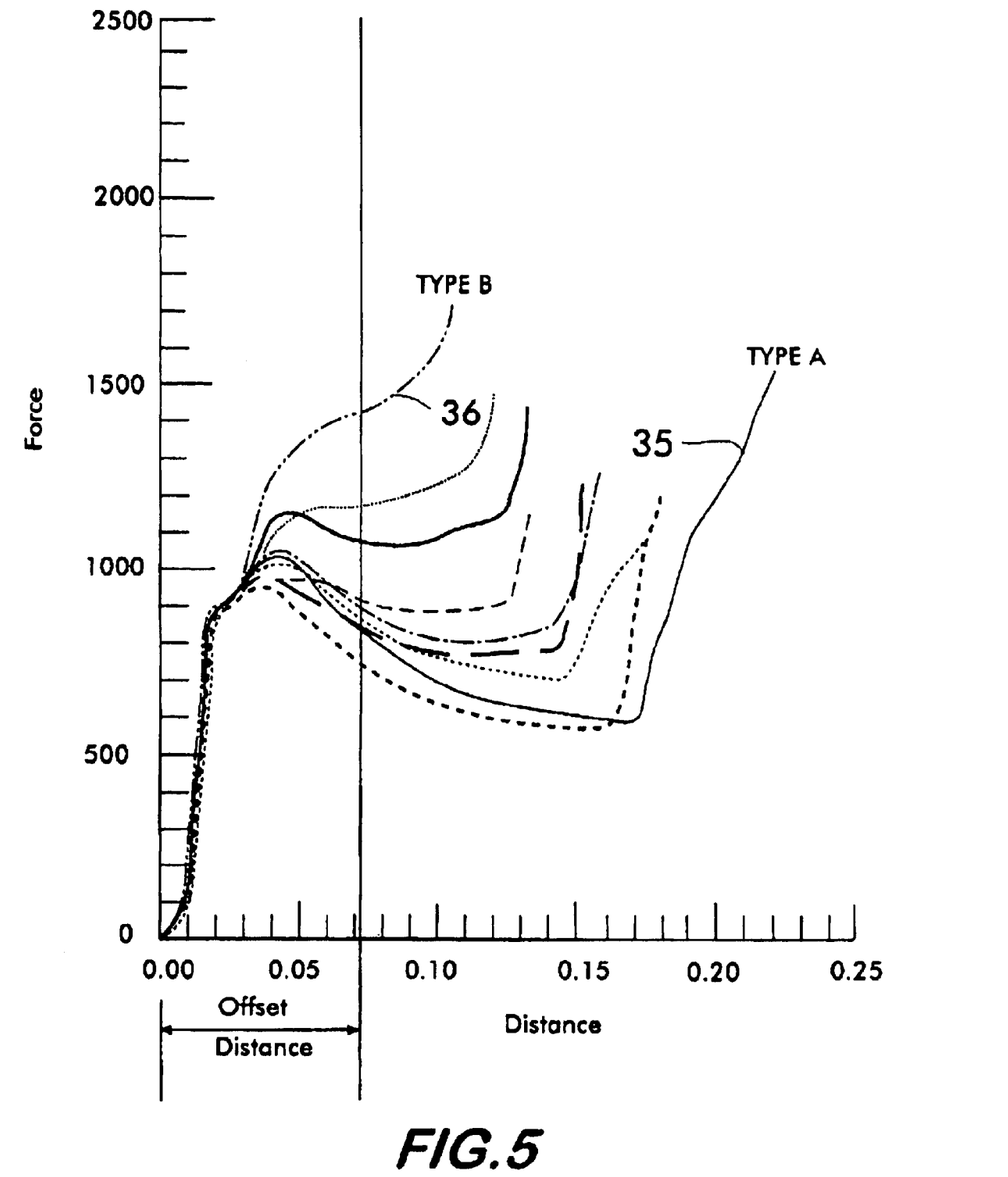
FIG. 5 is a graph of force-versus-deformation with a series nine typical blind threaded insert installation curves plotted. The curves cover the range of grip thickness.

FIG. 5 is a graph of force-versus-deformation that contains 9 typical curves for the installation of a blind threaded insert. Beginning from left to right, the curves represent the same insert installed into progressively thicker panels. As the panel thickness increases, the curve shape changes. Seven of these curves exhibit an intermediate maximum point followed by a decrease in force and are therefore classified as type A curves. The remaining two curves do not exhibit an intermediate maximum and are therefore classified as type B curves. Of the curves shown, the curve 36 is the maximum grip thickness type B curve and curve 35 is the minimum grip thickness and a type A curve.

Therefore, two different types of force/deformation curves are observed during installation depending upon the thickness of the panel into which the insert is installed. It is critical to the control algorithm that, as referred to below, either a "Type A" curve (installation in a thinner panel) or a "Type B" curve (installation in a thicker panel) be recognized during the installation process. The "Type A" or "Type B" decision point occurs after an initial deformation setpoint distance is reached, hereinafter referred to as the "offset distance." The offset distance is chosen to be greater than the distance at which the relative maximum point occurs on the minimum grip thickness curve 35 and less than the distance at which the increase in slope occurs on the maximum grip thickness curve 36. Determining this offset distance requires first taking an experimental history of the insert with panels of varying thickness as shown in FIG. 5.

Figure 6:
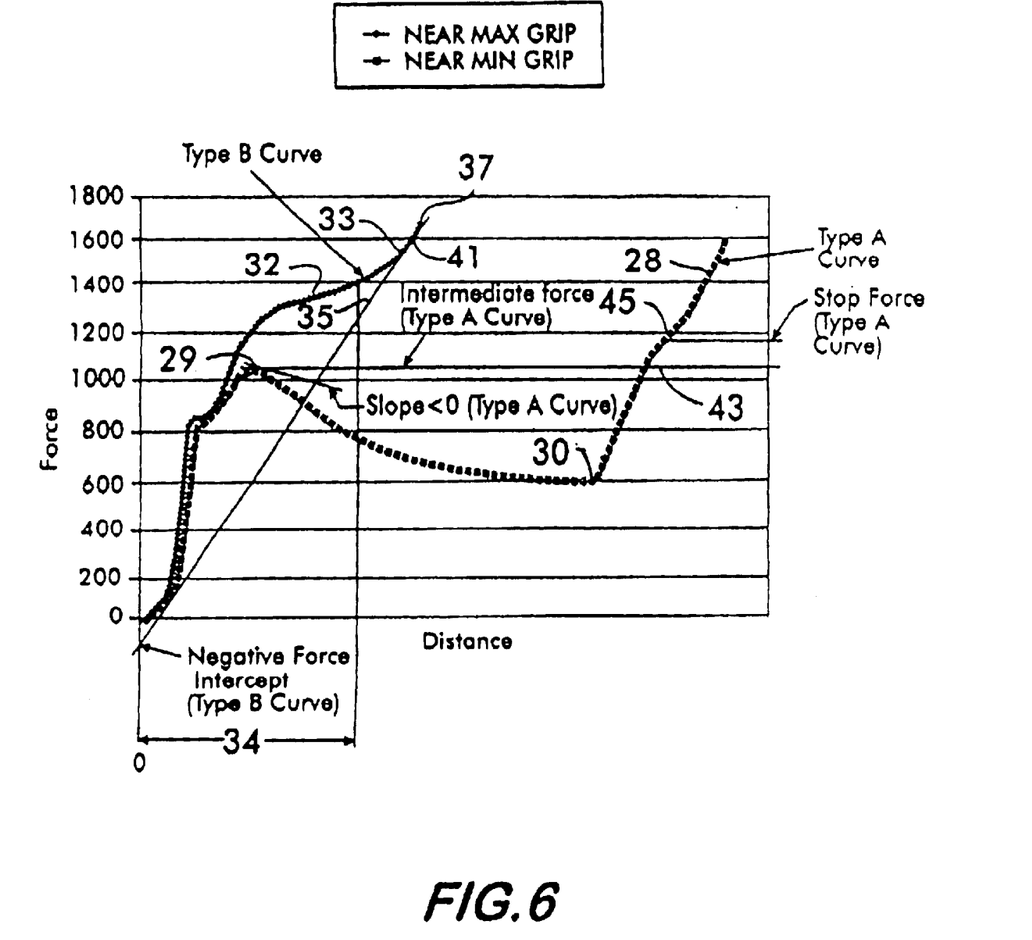
FIG. 6 is a graph of force-versus-deformation with two typical blind threaded insert installation curves plotted; one for near minimum grip thickness and one for near maximum grip thickness.

FIG. 6 is a graph which depicts force-versus-deformation that contains two typical curves that are developed during the installation of a blind threaded insert for two very different grip thicknesses that correspond generally to minimum and maximum grip thickness curves of FIG. 5. The curve for an insert installed near minimum grip thickness 28 has a relative maximum point 29 beyond which the load drops off as the bulb forms. When bulb formation is complete (FIG. 3) there is a point 30 at which there is a dramatic increase in slope that is caused by the upper and lower halves of the inner wall of the counterbore making contact with each other forming the bulb. The other curve for an insert installed near maximum grip thickness 37 does not have a relative maximum point, but does have a point 32 representing the onset of significant yielding. For this curve, the load continues to increase as the bulb is formed. When bulb formation is complete there is a point 33 at which there is a dramatic increase in slope which is caused by the two halves of the bulb making contact with one another.

Referring again to FIG. 6, line 35 that is tangent to a recent point on the force deformation type B curve. The control system of the invention periodically calculates this line after a type B curve has been identified, that is when the force/deformation data proceeds past the offset distance 34 without recording a negative slope. When the calculated tangent line registers a force axis intercept less than zero, a stop signal will be generated at point 41. This occurs at approximately 1,600 pounds of force. It will be noticed from the type B curve in FIG. 6 that this corresponds to a point on the curve when the load begins to increase rapidly.

Also depicted in FIG. 6 is a type A curve which is identified when the periodically calculated slope of the curve is less than zero and is observed before the offset distance is reached. This represents an intermediate peak 29 in the curve which corresponds to an intermediate force value represented by line 43. The pulling force continues until the load reaches this intermediate force value multiplied by a factor which yields the ultimate stop force. A multiplier factor, say 1.1, is used because test results have shown that the stop force point 45 should be slightly greater than the force at the intermediate peak 29, in this case approximately 1,080 pounds of force.

Figure 7:
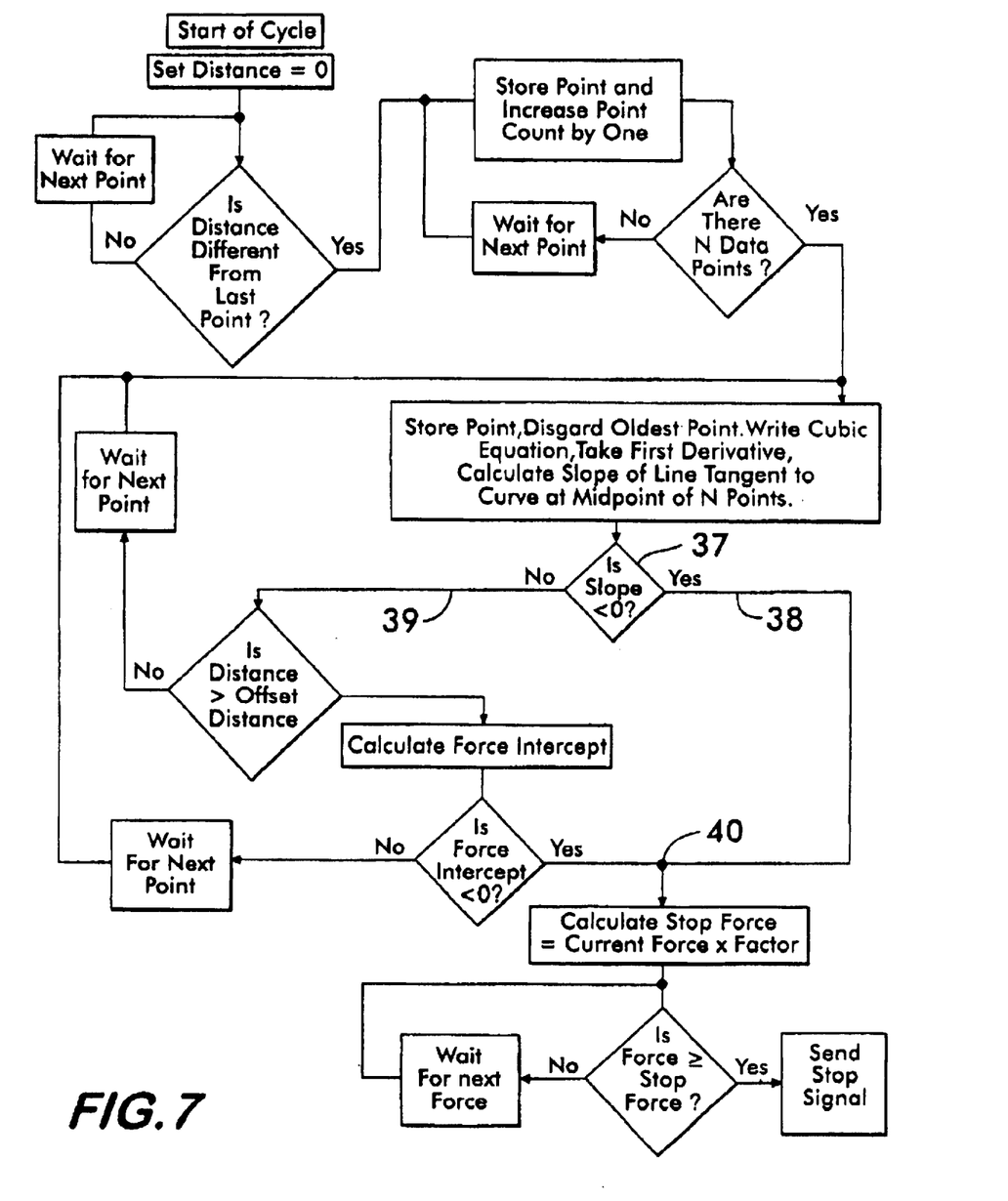
FIG. 7 is a flow chart of the algorithm used to control the tool and determine its stopping point.

Referring now to FIG. 7, a control algorithm flow chart depicts the process described above. The algorithm has a branching point 37, which is based on the two curve types defined above. As previously explained, the determination of curve type is based on whether the slope of a line tangent to a recent point on the curve changes from a positive value to a negative value before the distance exceeds the preset offset distance value. If it does, the curve is determined to be type A and the right-hand branch 38 of logic is followed. If the slope does not change from a positive value to a negative value before the distance exceeds the preset offset distance value the curve is determined to be type B and the left-hand branch 39 of logic is followed. The two logic branches merge at a later point 40 beyond which the logic is the same and requires only monitoring of the force. The stop signal is generated when the force reaches a calculated value.

An important concept embraced by the algorithm of the invention is the significance of the force axis intercept on a force deformation plot for a mechanical system loaded to yield. For a given system loaded to and through the yield, the force intercept will never become negative. However, if a second system is physically placed in parallel with the first system after some deformation of the first system, the curve for the new, combined mechanical system will have a new origin, which is negative with respect to the origin of the first system. When the bulb of a blind threaded fastener is formed, the upper and lower halves of the inner wall of the counterbore contact one another at the end of the process. This contact is analogous to introducing a second system. For this reason, the force axis intercept going negative can be used as a reliable indicator of the two halves of the bulb coming together and is therefore a reliable indicator that the formation of the bulb is complete.

The preferred embodiment described above can be applied equally to a hand held tool or to a robotically moved automated tool. Other embodiments are also possible and are anticipated within the scope of this invention, specifically other embodiments using different means to actuate the mandrel between the fully extended state and the stopping point. Another anticipated embodiment measures the tensile force in the mandrel or any other part connected to it, instead of measuring the compressive force in the head support member as the above embodiment.

It will be readily understood from the description of the preferred embodiment that the objects of the invention have been achieved by the preferred embodiment. Set-up steps necessary for different panel thicknesses with tools of the existing art are not required. The control algorithm installs each fastener to the optimum point for the actual fastener and grip conditions of that particular installation. Consequently, the tool can install a variety of fasteners of the same thread size into a variety of grips without the need to adjust or change the control algorithm. Also, changes in fastener or grip conditions can be detected by the location of the optimum stopping point relative to a predetermined region on the force-deformation graph.

It will be apparent to those of skill in the art from the foregoing description of the preferred embodiment that the objects and advantages of the invention have been achieved. It should be understood however that there may be other modifications and changes to the present invention that will be obvious to those of skill in the art from the foregoing description, however, the present invention should be limited only by the following claims and their legal equivalents.

What is claimed is:

1. A method of operating a tool for installing a deformable fastener into a panel, comprising the steps of:

inserting a deformable fastener through a hole and into a panel;

applying a compressive force to the deformable fastener to deform and secure the fastener to the panel;

measuring the amount of applied force and the distance of fastener deformation as said force is being applied;

plotting the amount of force versus the deformation distance to generate a force-deformation curve as the force is being applied;

measuring periodically the slope of the force-deformation curve;

determining when the slope of the force-deformation curve changes from positive to negative;

periodically comparing the deformation distance to a deformation setpoint;

obtaining a force value by recording the maximum measured force when the slope changes from positive to negative prior to said deformation setpoint;

multiplying said force value by a factor to obtain a stop force; and halting the applied force when the stop force is reached.

2. A method of operating a tool for installing a deformable fastener into a panel, comprising the steps of:

inserting a deformable fastener through a hole and into a panel;

applying a compressive force to the deformable fastener to deform and secure the fastener to the panel;

measuring the amount of applied force and the distance of fastener deformation as said force is being applied;

plotting the amount of force versus the deformation distance to generate a force-deformation curve as the force is being applied;

measuring periodically the slope of the force-deformation curve;

determining when the slope of the force-deformation curve changes from positive to negative;

periodically comparing the deformation distance to a deformation setpoint;

obtaining a force value by periodically calculating a force axis intercept of a straight line that is tangent to a recent point on the force-deformation curve and recording the force when the force intercept drops below a predetermined value and the deformation setpoint has been exceeded;

multiplying said force value by a factor to obtain a stop force; and halting the applied force when the stop force is reached.

3. The method of claim 1 or 2 wherein said fastener is a blind threaded insert.

4. The method of claim 1 or 2 wherein the step of applying a compressive force comprises threading a mandrel into a bore of said insert and applying a pulling force such that a head of said insert is forced against a head support means of a tool which carries the mandrel.

* * * * *

UNITED STATES PATENT AND TRADEMARK OFFICE
CERTIFICATE OF CORRECTION

PATENT NO. : 6,851,167 B2
DATED : February 8, 2005
INVENTOR(S) : Gary Harlow and Ronald S. Dise It is certified that error appears in the above-identified patent and that said Letters Patent is hereby corrected as shown below:

Column 4,
Line 42, "6" should be deleted.

Signed and Sealed this

Thirteenth Day of September, 2005

JON W. DUDAS
*Director of the United States Patent and Trademark Office*